UNITED STATES PATENT OFFICE.

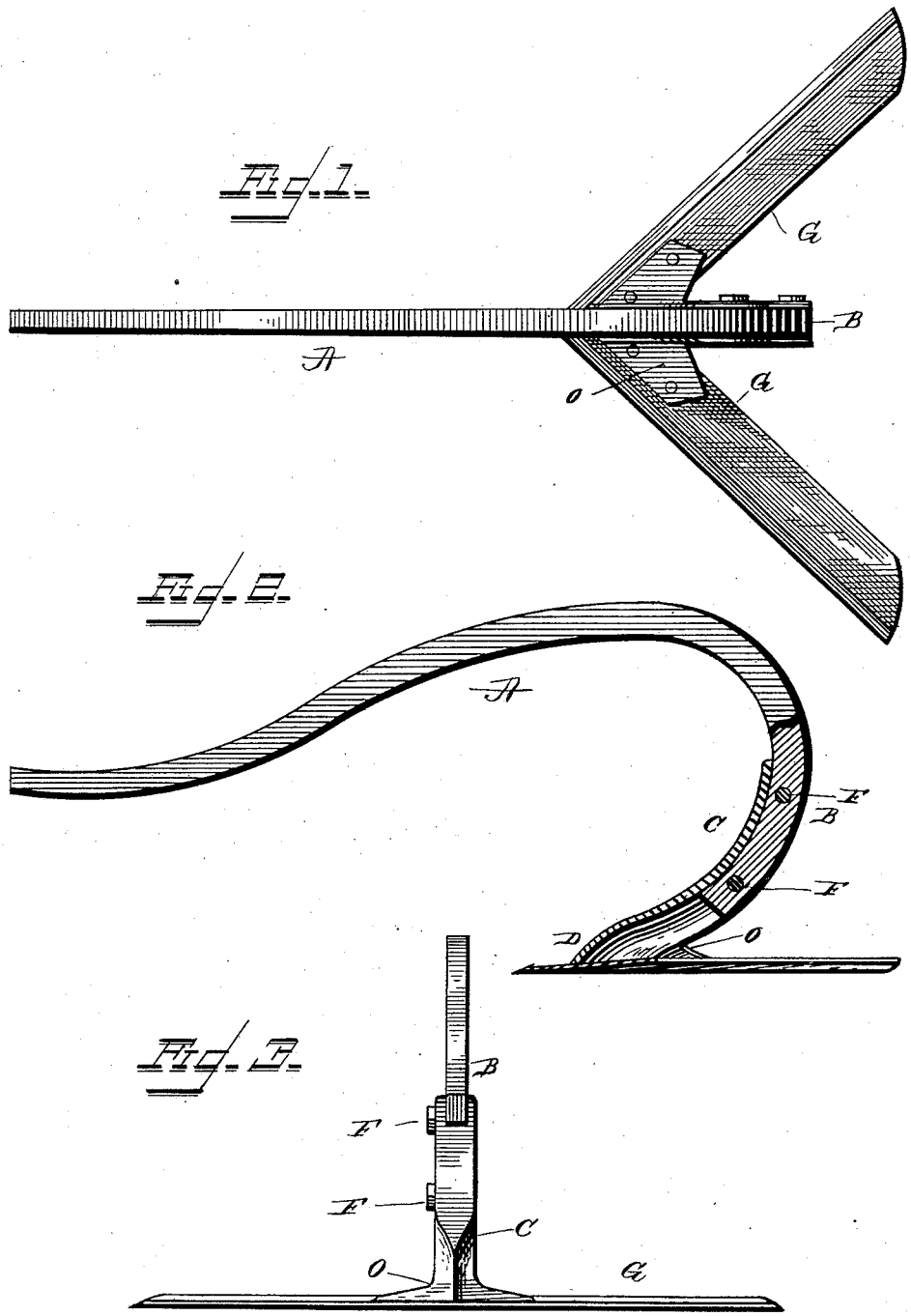

JOSEPH J. FAIRES, OF McKINNEY, TEXAS, ASSIGNOR OF TWO-THIRDS TO FRANCIS EMERSON AND JOHN R. CUMMINS, BOTH OF SAME PLACE.

STALK AND WEED CUTTER.

SPECIFICATION forming part of Letters Patent No. 333,938, dated January 5, 1886.

Application filed September 16, 1885. Serial No. 177,255. (No model.)

*To all whom it may concern:*

Be it known that I, JOSEPH J. FAIRES, a citizen of the United States, residing at McKinney, in the county of Collin and State of Texas, have invented certain new and useful Improvements in Stalk and Weed Cutters; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a top view of my stalk and weed cutter. Fig. 2 is a vertical longitudinal section of the same, and Fig. 3 is a front view.

My invention relates to cotton-stalk and weed cutters; and it consists in the construction and novel combination of parts, as will be hereinafter fully described, and particularly pointed out in the claim.

In this class of agricultural implements as usually constructed, the weeds and stalks have been cut above the surface of the ground, which leaves the stubble standing, and is disagreeable to walk over in following the cutter. I aim to obviate this difficulty and to thoroughly eradicate the stalks and weeds by cutting them below the surface of the ground, where the stalks, &c., are soft and easily cut, because they are firmly held in the ground, so that instead of yielding before the knife they will be held both above and below the cutting-edge of the blade, and will thereby make provision for a thorough cut. The cutter-blades run under the ground, and leave the surface level and thoroughly pulverize it as deep as the cut is made, which is usually from one to two inches deep. The dimensions of the blades are such that a swath from two to four feet wide is usually cut.

The cutter may be used either as a walking or sulky cutter, and the knives may be made in one or more pieces, as may be desired.

Referring by letter to the accompanying drawings, A designates the cutter-beam, which is provided with a rearwardly, downwardly, and forwardly curved standard, B.

C designates the stem or shank, which is made integral with the frog or arrow-point D, and is open at its bottom, rear side, and top, so that it may receive the standard B, which is secured in place therein by bolts F F. The cutter or plate G is >-shaped in outline, and may be made in one or two pieces, and is securely riveted to the under face of the arrow-point D. The under faces of the wings of the frog O incline from their front edges to their rear edges upwardly at angles from fifteen degrees to twenty degrees, and are curved or rounded inwardly at their outer ends from their cutting-edges to their back edges. The angles of rearward and upward inclination above mentioned cause the same cutter to run under the surface of the ground when in operation to a depth of one or two inches.

Having described this invention, what I claim, and desire to secure by Letters Patent, is—

The improved plow herein described, consisting of the beam A, having rearwardly, downwardly, and forwardly curved standard, the arrow-point D, having the stem or shank C, formed entire and open at its bottom, rear side, and top to receive the said standard, and the diamond-shaped cutter consisting of two wings inclined upwardly from their front to rear edges, and curved inwardly at their outer ends from their cutting-edges to their back edges, substantially as shown and described.

In testimony whereof I affix my signature in presence of two witnesses.

JOSEPH J. FAIRES.

Witnesses:
 FRANCIS EMERSON,
 J. R. CUMMINS.